UNITED STATES PATENT OFFICE.

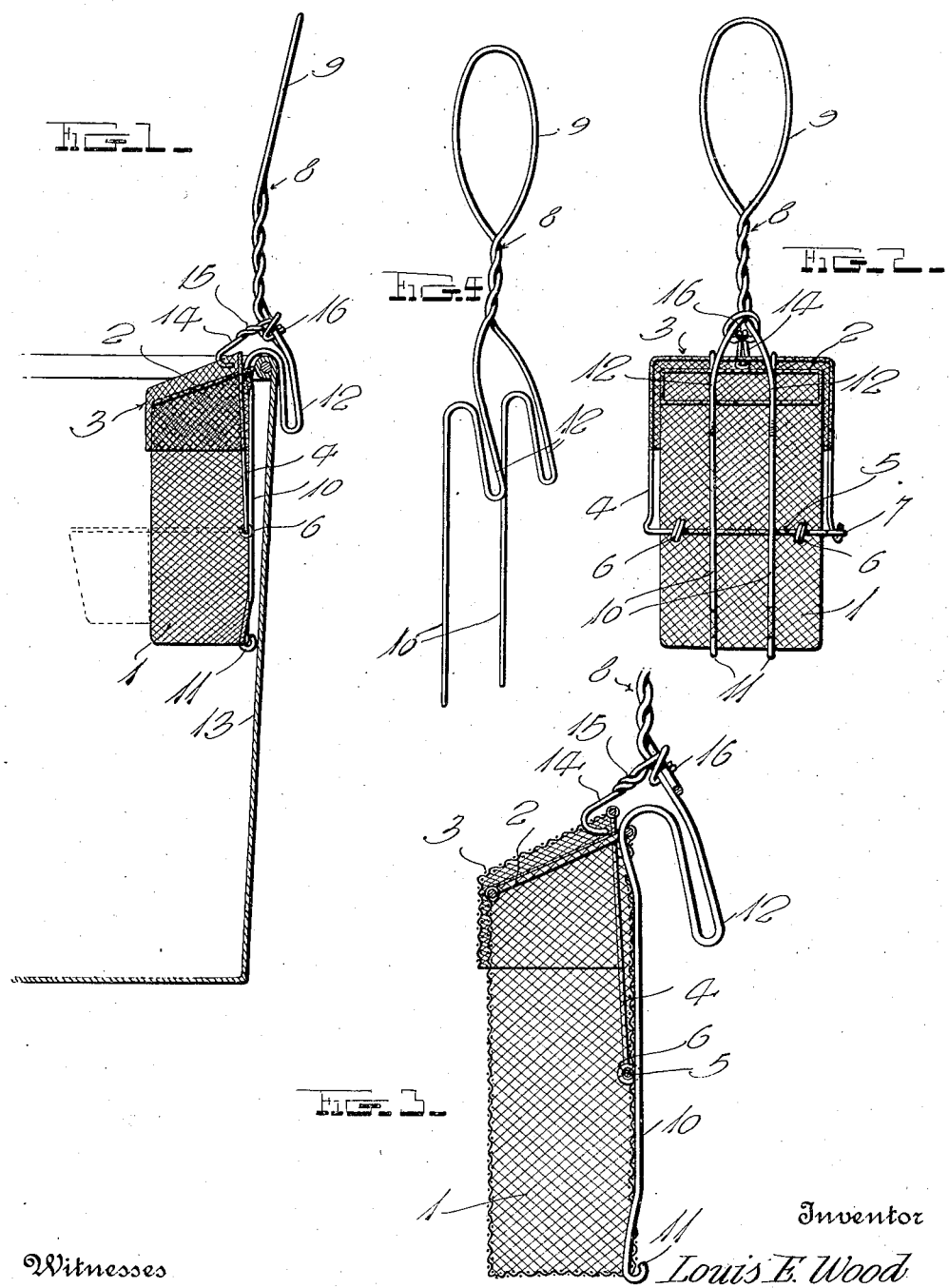

LOUIS E. WOOD, OF FARRELL, PENNSYLVANIA.

SOAP-CONTAINER.

1,351,273.           Specification of Letters Patent.    Patented Aug. 31, 1920.

Application filed May 17, 1920. Serial No. 382,146.

*To all whom it may concern:*

Be it known that I, LOUIS E. WOOD, a citizen of the United States, residing at Farrell, in the county of Mercer and State of Pennsylvania, have invented certain new and useful Improvements in Soap-Containers; and I do declare the following to be a full, clear, and exact description of the invention, such as will enable others skilled in the art to which it appertains to make and use the same.

This invention relates to an improved soap container for use about a kitchen and one object of the invention is to provide a soap container so constructed that a cake of soap may be placed in the container or small pieces of soap placed in the container and thus small pieces of soap which are usually lost or thrown away permitted to be made use of.

Another object of the invention is to provide an improved soap container which is so constructed that the handle by means of which the container is held may further provide means for suspending the container from a sink, bucket or other receptacle.

Another object of the invention is to provide this container with a handle so constructed that it may be formed of a strand of heavy wire bent to the desired shape and having spaced arms connected with the container of woven wire and bent to provide suspending prongs.

Another object is to provide an improved type of cover engaging hook carried by the handle and limited in its transverse movement thus preventing it from moving out of the desired position and swinging to the rear of the handle.

Another object of the invention is to provide an improved type of cover for the receptacle together with an improved yoke for mounting the cover for swinging movement.

This invention is illustrated in the accompanying drawings wherein:

Figure 1 is a view showing the soap container in side elevation and suspended from the upper edge of a water receptacle shown in section.

Fig. 2 is a view showing the soap container from rear elevation.

Fig. 3 is a vertical sectional view through the container.

Fig. 4 is a perspective view of the handle removed from the receptacle.

This improved soap container is provided with a receptacle 1 which will be formed preferably of woven wire and will be reinforced at its open upper end by the binding wire 2 over which the strands of the wire forming the receptacle will be bent. The upper end of this receptacle is cut at an incline as shown in Figs. 1 and 3 so that the cover 3 may be readily swung from a lowered or open position to a raised or closed position. This cover 3 is also formed of woven wire and is provided with depending flanges for extending along the front and side walls of the receptacle when the cover is in place as shown in Fig. 3. A yoke 4 is connected with this cover by having the strands of the cover bent about the cross bar and side arms of the yoke and one of these side arms is of greater length than the second as shown in Fig. 2 and is bent to provide a pivot bar 5 which is extended transversely of the rear wall and held in engagement with the same by the eyes 6. It will thus be seen that when the ends of the wire forming the yoke are connected as shown at 7 the yoke will be securely held in engagement with the rear wall of the receptacle and the cover may be easily swung to an open or a closed position.

This receptacle is provided with a handle 8 which will be formed from a strand of relatively heavy wire. The strand of wire is bent at a point intermediate its length to provide the head 9 of the handle which will be grasped when using the soap container. The strands are then twisted to provide a strong shank and the arms are then spread apart to provide stems 10 for engaging the rear wall of the receptacle. These stems are passed through the openings of the fabric forming the receptacle as shown in Fig. 3 and have their free ends bent back upon themselves to provide hooks 11 which securely hold the handle in engagement with the receptacle. Above the receptacle the stems are doubled back upon themselves to provide prongs 12 for engaging the upper edge of a pan or other similar receptacle 13 as shown in Fig. 1.

The cover 3 should be releasably secured in the raised or closed position when the device is in use and in order to do so there has been provided a hook 14 which is formed from a strand of wire bent back upon itself and twisted as shown at 15 and having its arms extending upon opposite sides of the shank portion of the handle 8 and after being bent about the shank portion of the handle extended between the upper ends of the stems 10. It will thus be seen that the hook is provided with an eye through which the shank portion of the handle passes and that this eye carries prongs 16 which extend between the upper ends of the stems and prevent the hook from having transverse swinging movement beyond the desired amount. Therefore the hook will not tend to swing to one side but will be kept in the desired position above the open upper end of the receptacle.

When in use the soap container will be suspended from the upper edge of a dish pan or sink or any other desired receptacle and the soap will be placed in the receptacle. If a whole cake of soap is placed in the receptacle the cover will be swung to the closed position and retained in this position by the hook 14 but if a whole cake of soap is not placed in the receptacle the receptacle will be left hanging upon the upper edge of the water container with the cover released and swung downwardly as shown in dotted line in Fig. 1 to provide a soap tray. Small pieces of soap which would ordinarily be lost or thrown away will be dropped into this receptacle and when it is desired to provide soapy water for washing dishes or other similar purposes the cover will be swung to the raised or closed position and retained in this position by the hook. The handle will then be grasped by the head 9 and the device removed from its support. It will then be extended down into the water of the dish pan and the receptacle moved through the water thus causing the soap in the receptacle to be melted and form suds. As soon as a sufficient quantity of suds has been provided the soap holder will be returned to its position upon the upper edge of the sink or dish pan where the soap will be supported out of contact with the water and allowed to dry and further the soap prevented from being wasted by being left in the pan of hot water.

What is claimed is:

1. A soap holder comprising a receptacle of foraminate material open at its upper end, a carrier pivotally connected with the rear wall of the receptacle for swinging movement from a position extending above the receptacle to a position in front of the receptacle, a cover carried by the carrier for closing the upper portion of the receptacle when the carrier is in a raised position, and a handle connected with the receptacle.

2. A soap holder comprising a receptacle of foraminate material open at its upper end, a yoke pivotally connected with the receptacle for swinging movement, a cover carried by the yoke and having side flanges engaging the sides and front walls of the receptacle when the cover is extended across the open upper end of the receptacle, and a handle carried by the receptacle.

3. A soap holder comprising a receptacle of foraminate material open at its upper end, a cover for the receptacle, a handle having arms connected with the receptacle and extending from the same and bent back upon themselves to provide support engaging prongs, and a cover engaging hook having arms coiled about the arms of the handle and having their ends extending between the arms of the handle to limit transverse swinging movement of the hook.

4. A soap holder comprising a receptacle of foraminous material open at its upper end, a carrier pivotally connected with the receptacle for swinging movement from a position extending above the receptacle to a position extending transversely of and in front of the receptacle, and a cover for the open upper end of the receptacle carried by the carrier.

In testimony whereof I have hereunto set my hand.

LOUIS E. WOOD.